Patented Dec. 4, 1951

2,577,121

UNITED STATES PATENT OFFICE 2,577,121

SUBSTITUTED ETHYLAMINES

Louis H. Goodson, Kansas City, Mo., Robert Bruce Moffett and James E. Stafford, Kalamazoo, Mich., and Willard M. Hoehn, Kansas City, Mo., assignors to George A. Breon & Company, Kansas City, Mo., a corporation of Missouri No Drawing. Application November 19, 1948, Serial No. 61,123

7 Claims. (Cl. 260—570.5)

This invention relates to certain 1,2-diarylethylamines and salts thereof which are valuable as pharmaceutical agents and to the preparation thereof.

We have discovered that alpha-(tricyclic aryl)-beta-(monocyclic aryl)ethylamines, and salts thereof, are especially useful as pharmacological agents, for example for producing mild analgesia.

Our new amines have the general formula $Ar_1$—$CH_2$—$CH(Ar_2)$—$N=B$, where $Ar_1$ is a monocyclic aryl radical, such as phenyl, halophenyl, alkylphenyl, alkoxyphenyl, etc.; $Ar_2$ is a tricyclic fused ring aryl radical, such as fluorenyl, acenaphthyl, phenanthryl, anthryl, etc.; and —$N=B$ is an amino group of the class consisting of the primary amino group —$NH_2$, and aliphatic amino groups wherein the number of carbon atoms is 1–12, these groups including, for example, mono- and dialkylamino, such as methylamino, ethylamino, isopropylamino, n-hexylamino, dimethylamino, diethylamino, di-n-butylamino, etc.; alkenylamino, such as allylamino; mono- and bis-(haloalkyl)amino, such as 2-bromoethylamino, 2-chloroethylamino, bis-(2-chloroethyl), etc.; mono- and bis-(hydroxyalkyl)amino, such as 2-hydroxyethylamino, (2-hydroxy-1-propyl)amino, bis(2-hydroxyethyl)-amino, etc.; aminoalkylamino, such as 2-diethylaminoethylamino, 2-dimethylaminoethylamino, 3-diethylaminopropylamino, 2-(2-hydroxyethyl-amino)ethylamino, 1-methyl-4-(diethylamino)-butylamino, etc.; mono- and di-cycloalkylamino, such as cyclopentylamino, cyclohexylamino, dicyclohexylamino, etc.; cyclic polymethyleneimino, such as 1-piperidino, 2-methyl-1-piperidino, 1-pyrrolidino, etc.; and cyclic polymethyleneimino interrupted by a hetero atom, such as 4-morpholino, N-piperazino, etc. The divalent grouping =B can thus be two separate monovalent radicals such as hydrogen and alkyl, dialkyl, etc., or can be a single divalent radical such as alkylene or hetero-interrupted alkylene.

The compounds of our invention can be prepared by several synthetic methods. The method of choice in the preparation of a particular compound will vary according to availability or cost of the starting materials, yield of desired product, etc. In general, we have found it convenient to use one of the following processes.

(1) An aldehyde having the formula $Ar_2$—CHO is condensed with a primary amine having the formula $H_2N$—B', where B' represents an aliphatic radical wherein the number of carbon atoms is 1–12. The imine thus formed is treated with a Grignard reagent having the formula $Ar_1$—Mg—halogen, and the Grignard addition product is hydrolyzed with mineral acid in conventional manner, thus yielding the 1,2-diarylethylamine. These reactions can be represented by the following equations.

(a) $Ar_2$—CHO+$H_2N$—B'→$Ar_2$—CH(:N—B')

(b) $Ar_2$—CH(:N—B')+
     $Ar_1$—Mg—Halogen→(Addition product)

(c) (Addition product) $\xrightarrow{H^+}$ $Ar_1$—$CH_2$—$\underset{\underset{NH-B'}{|}}{CH}$—$Ar_2$ For example:

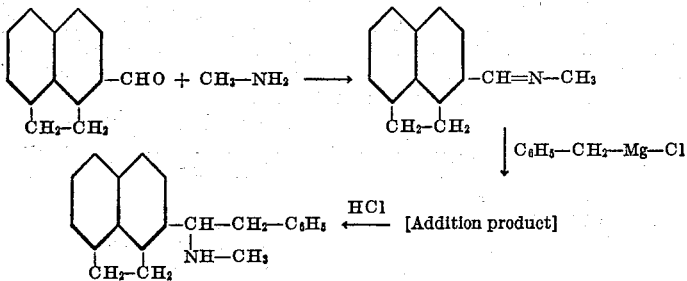

In the above process, when a 1,2-alkanolamine, such as ethanolamine, is employed to react with the aldehyde $Ar_2$—CHO, the resulting condensation product may be a 2-$Ar_2$-oxazolidine instead of the isomeric imine. However, the oxazolidine reacts in the subsequent Grignard reaction in the typical manner of the imines and thus the isomeric structure of the intermediate product is without consequence in the over-all process.

(2) A ketone having the formula $Ar_2$—CO—$CH_2$—$Ar_1$ is reacted with a salt of hydroxylamine, e. g. hydroxylamine hydrochloride, and the ketoxime thus formed is reduced to the corresponding amino compound. If desired, this primary amine in some instances can be alkylated to yield a secondary or tertiary amine derivative. These reactions can be represented by the following equations:

(a) $Ar_2$—CO—$CH_2$—$Ar_1$ + $H_2N$—OH·HCl →
$\qquad Ar_2$—C(:N—OH)—$CH_2$—$Ar_1$ (b) $Ar_2$—C(:N—OH)—$CH_2$—$Ar_1$ + $H_2$ →
$\qquad Ar_2$—CH($NH_2$)—$CH_2$—$Ar_1$ For example:

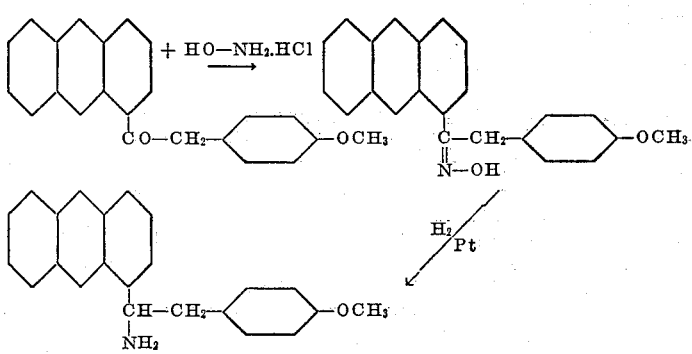

(3) A halogen compound having the formula $Ar_1$—$CH_2$—CH(halogen)—$Ar_2$ is treated with ammonia, or a primary or secondary amine having the formula H—N=B. The reaction proceeds according to the following equation:

$Ar_1$—$CH_2$—CH(halogen)—$Ar_2$ + H—N=B ⟶
$\qquad$ Aryl—$CH_2$—CH—$Ar_2$
$\qquad\qquad\qquad\qquad|$
$\qquad\qquad\qquad\ $ N=B As the primary or secondary amine, H—N=B, in this process there can be used, for example: mono- and di-alkylamines such as methylamine, diethylamine, dimethylamine, n-butylamine, etc.; substituted alkylamines, such as ethanolamine, diethanolamine, dialkylamines, haloalkylamines, (4- morpholino)-alkylamines, etc.; and cyclic secondary amines of the polymethyleneimine type, such as morpholines, piperidines, pyrrolidines, etc. It will be understood that in using this process best results are obtained when secondary amines are employed, since in these instances a minimum of by-products will be formed in the condensation reaction.

It is frequently preferable to isolate the final amine product obtained by the above processes as a salt such as the hydrochloride, from which, if desired, the free amine can be liberated by treatment with alkali.

The amines of our invention are in many cases water-insoluble oils and it is often convenient to use them therapeutically as the more watersoluble acid addition salts, such as those derived from non-toxic inorganic acids, including hydrochloric acid, hydrobromic acid, sulfuric acid, phosphoric acid, nitric acid, and the like, and non-toxic organic acids, including tartaric acid, citric acid, succinic acid, and the like, can be employed. Our compounds can also be used in the form of quaternary ammonium salts derived from lower alkyl esters of strong inorganic esters, organic sulfonic acids and the like, such as methyl chloride, methyl bromide, methyl iodide, ethyl bromide, methyl sulfate, etc.

Our invention is illustrated by the following examples without, however, being limited thereto.

*Example 1*

N-(3-diethylaminopropyl)-alpha-(5-acenaphthenyl) phenethylamine

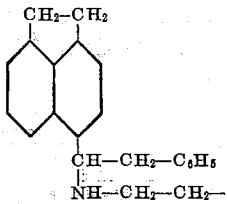

A. 25 g. of 5-acenaphthenecarboxaldehyde in 250 ml. of benzene was mixed with 19.7 g. of N,N-diethyl-1,3-propanediamine and the mixture was allowed to stand at room temperature for two days. From the reaction mixture there was obtained by distillation 17.1 g. of N-(3-diethylaminopropyl) - 5 - acenaphthenecarboxaldimine, boiling range 95–175° at 0.06 mm. pressure.

B. 16.1 g. of N-(diethylaminopropyl)-5-acenaphthenecarboxaldimine was treated with an ether solution of benzylmagnesium chloride prepared by interaction of 27.7 g. of benzyl chloride and 5.3 g. of magnesium and the mixture was heated under reflux on a steam bath for two hours. The reaction mixture was then cooled and poured into a mixture of ice and hydrochloric acid. The precipitate which separated was collected on a filter, dried, and crystallized from methanol-acetone mixture. There was thus obtained 20 g. of crude N-(3-diethylaminopropyl)-alpha-(5 - acenaphthenyl)-phenethylamine dihydrochloride. The pure compound, obtained by recrystallization from methanol, melted at 151–156° C. The free amine reacts with methyl iodide to form a methiodide.

*Example 2*

Alpha-(3-acenaphthenyl) phenethylamine

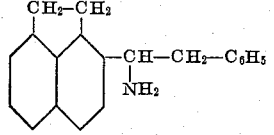

A. A mixture of 10 g. of 3-(phenylacetyl)acenaphthene, 10 g. of hydroxylamine hydrochloride, 50 ml. of pyridine, and 50 ml. of anhydrous ethanol was heated under reflux for three hours. The solvents were evaporated from the mixture and the residue was washed with water and then dissolved in 50 ml. of ethanol. On cooling the alcoholic solution, 9 g. of 3-(phenylacetyl)acenaphthene oxime, M. P. 127–130° C., was obtained.

B. To a solution of 9 g. of 3-(phenylacetyl)-acenaphthene oxime in 75 ml. of ethanol there was added 7.2 g. of sodium. After the reaction had subsided, an addition 25 ml. of ethanol was added. After all of the sodium had reacted, 25 ml. of water was added, and the alcohol was evaporated from the mixture under reduced pressure. The residue was extracted with ethyl ether. The ether solution, which contained alpha-(3-acenaphthenyl)phenethylamine, was dried over anhydrous sodium sulfate, and hydrogen chloride was bubbled into the dry solution. There was thus precipitated 5.7 g. of alpha-(3-acenaphthenyl)phenethylamine hydrochloride, M. P. 238–240° C.

*Example 3*

Alpha-(2-fluorenyl)phenethylamine

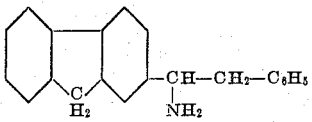

19.5 g. of benzyl 2-fluorenyl ketoxime, prepared by interaction of benzyl 2-fluorenyl ketone and hydroxylamine hydrochloride, was reduced with sodium and ethanol in a manner similar to the reduction described in part B of Example 2. There was thus obtained 12 g. of alpha-(2-fluorenyl)phenethylamine hydrochloride, M. P. 255–265° C.

*Example 4*

Alpha-(5-acenaphthenyl)phenethylamine

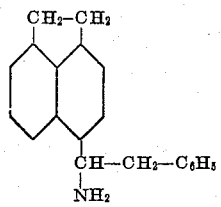

A. A mixture of 10 g. of 5-(phenylacetyl)acenaphthene, 10 g. of hydroxylamine hydrochloride and 50 ml. of ethanol was heated on a steam bath for two hours and then the solvents were evaporated from the reaction mixture at reduced pressure. The residue was washed with water and crystallized from ethanol. There was thus obtained 7 g. of 3-(phenylacetyl)acenaphthene oxime, M. P. 134–136° C.

B. To a solution of 7 g. of 5-(phenylacetyl)-acenaphthene oxime in 70 ml. of boiling ethanol there was added 7 g. of sodium. After the reaction had subsided, an addition 25 ml. of ethanol was added to the reaction mixture. After all of the sodium had reacted, 25 ml. of water was added, and the alcohol was evaporated from the mixture under reduced pressure. The residue was stirred with water and ether. The ether layer, which contained alpha-(5-acenaphthenyl)-phenethylamine, was separated, dried, and hydrogen chloride was bubbled into the ether solution. The solid which precipitated was alpha-(5-acenaphthenyl)phenethylamine hydrochloride, M. P. 221° C. (dec.).

We claim:

1. A compound of the group consisting of 1-(tricyclic aryl)-2-(monocarbocyclic aryl)ethylamines having the formula

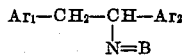

where $Ar_1$ is a member of the class consisting of phenyl and methoxyphenyl radicals; $Ar_2$ is a tricyclic fused-ring carbocyclic aryl hydrocarbon radical of the class consisting of fluorenyl, acenaphthenyl, and anthryl radicals; and —N=B is an amino radical of the class consisting of the primary amino group —NH₂, the methylamino radical, and [(di-lower alkyl)amino-lower alkyl]—NH— radicals wherein the number of carbon atoms does not exceed 12; and addition salts thereof.

2. An addition salt of a compound having the formula

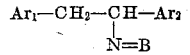

where $Ar_1$ is phenyl; $Ar_2$ is an acenaphthenyl radical; and —N=B is the primary amino group —NH₂.

3. An addition salt of a compound having the formula

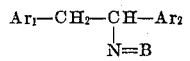

where $Ar_1$ is phenyl; $Ar_2$ is a fluorenyl radical; and —N=B is the primary amino group —NH₂.

4. An addition salt of alpha-(3-acenaphthenyl)phenethylamine, said amine having the formula

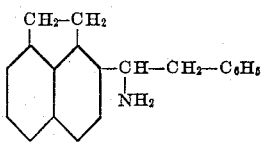

5. An addition salt of alpha-(2-fluorenyl)-phenethylamine, said amine having the formula

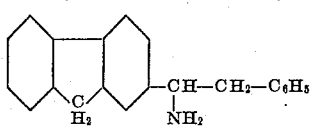

6. An addition salt of alpha-(5-acenaphthenyl)phenethylamine, said amine having the formula

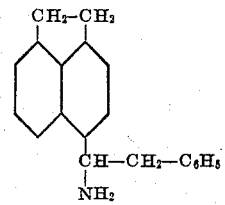

7. An addition salt of N-(3-diethylaminopropyl)-alpha-(5-acenaphthenyl)phenethylamine, said amine having the formula

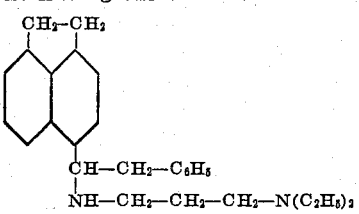

LOUIS H. GOODSON.
ROBERT BRUCE MOFFETT.
JAMES E. STAFFORD.
WILLARD M. HOEHN.

REFERENCES CITED

The following references are of record in the file of this patent:

Gonzales, "Bull. soc. chim.," vol. 37, pp. 1591–1596 (1925).